J. F. WATSON.
Watch Case.
No. 586. Reissued Aug. 17, 1858.
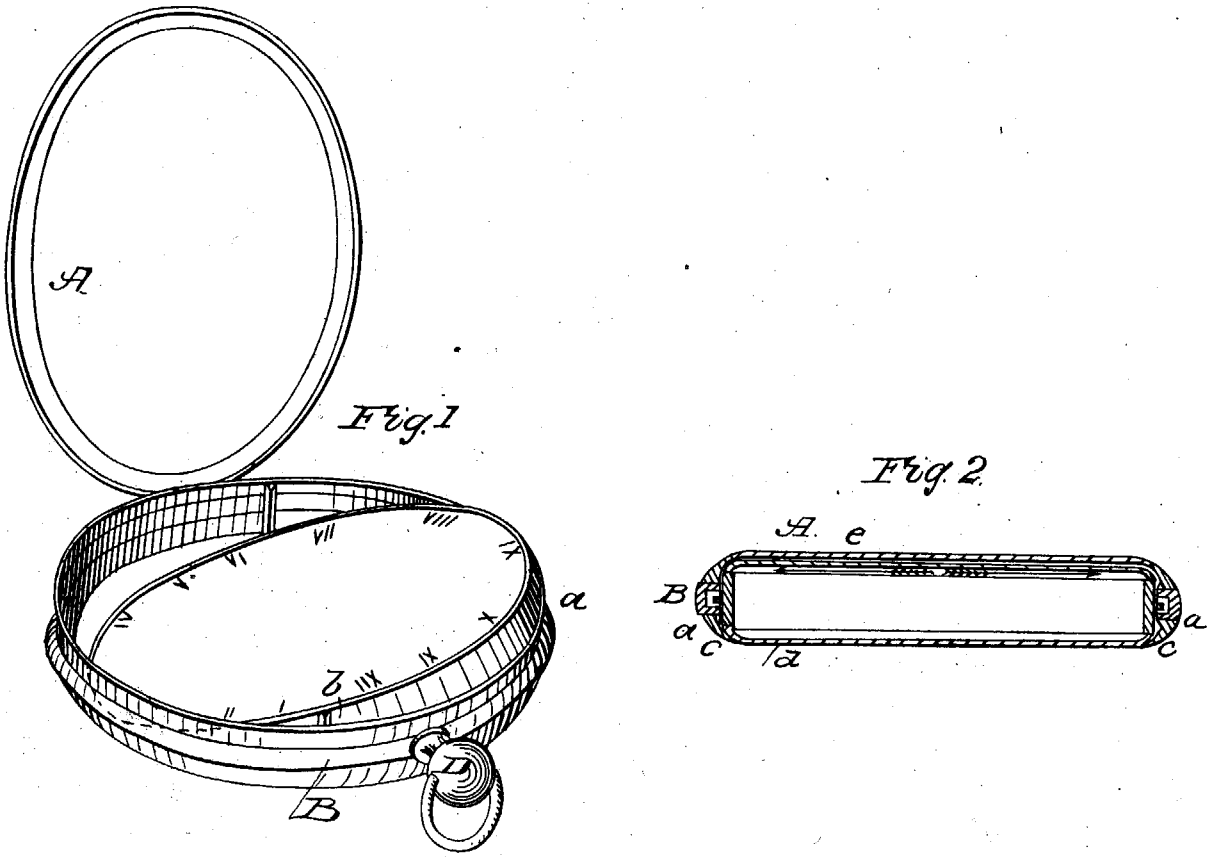
N. PETERS, Photo-Lithographer, Washington, D. C.

UNITED STATES PATENT OFFICE.

W. E. BALDWIN AND E. BLISS, OF NEWARK, NEW JERSEY, ASSIGNEES OF JNO. F. WATSON.

IMPROVEMENT IN WATCH-CASES.

Specification forming a part of Letters Patent No. 19,972, dated April 13, 1858; Reissue No. 586, dated August 17, 1858.

*To all whom it may concern:*

Be it known that JOHN FORREST WATSON, of St. John Square, Clerkenwell, in the county of Middlesex, England, and a subject of the Queen of Great Britain, did invent certain new and useful Improvements in Watch-Cases, of which the following is a full, clear, and exact description, reference being made to the accompanying drawings, forming part of this specification, in which—

Figure 1 represents a perspective view of a watch-case embracing the improvements. Fig. 2 represents an edge view of the same, with a portion of the outer case removed, showing the connection between the inner and and outer case.

The improvements in watch-cases relate to that class known as the "magic hunter-case," which, as is well known, consists of two cases, an interior and exterior. The interior holds the works of the watch, and is furnished with a metallic back and a glazed front. The exterior is composed of a ring for holding the body of the watch, with an open frame hinged to one side and a closed back to the opposite. The pendant is attached to the interior case, and extends through a socket in the ring of the outer case, and the inner case is so arranged that it can be reversed in the outer by being taken out, so that the dial may face either the open frame or the closed back of the outer case, thus forming an open face or hunting watch.

The improvements in watch cases consist in connecting the inner case, holding the works and dial of the watch, permanently with the ring of the outer case by means of journals, on which the inner case turns when reversed in the outer case, in order to exhibit either the glazed front or the back through the bezel of the outer case, by which means the watch may be changed from an open-face to a hunting watch, or vice versa, without disconnecting the cases, as has heretofore been the practice.

In the accompanying drawings is represented a watch-case embracing the improvements, which consist of an interior and exterior case. The interior case holds the works and forms the body of the watch, and is provided with a glazed front, *c*, covering the dial-plate, and a metallic back, *d*. The outer case consists of a central ring, B, in which the body of the watch is placed, and to which is hinged on one side an open frame or bezel, C, and to the opposite a closed back, A, and a pendant or handle, D, is also attached to the ring. The body of the watch is confined by pivots *a* to the ring B of the outer case, so that it can revolve within this ring when the front and back are open, thus bringing the dial opposite the open bezel C or the closed back A without disconnecting the cases, and thus make either an open-face or hunting watch.

The pivots are attached to the body of the watch directly opposite each other, half-way between the figures XII and III on one side, and IX and VI on the opposite side, of the dial plate, and the bearings for the pivots are arranged in the ring B, so that the figure XII will be opposite the pendant when the dial faces the open bezel, or at right angles to it when it faces the closed back of the outer case, by which means, when the watch is reversed, a quarter-revolution is given to it, bringing the figure XII in a proper position for either the hunting or open-face watch.

A guide projection, 1, on each side of the ring of the inner case fits into a corresponding groove, *e*, on the interior of the ring of the outer case and steadies the watch. Thus it will be seen that the inner case is permanently pivoted to the outer case, so that it can be reversed in the outer case to face the dial in opposite directions to form either an open-face or hunting watch, and that in reversing the works the dial is shifted one-quarter of a circle to bring the figure XII of the dial-plate in proper position in relation to the pendant for either an open-face or hunting watch.

Having thus described the improvements in double-case watches, what is claimed therein as new, and desired to be secured by Letters Patent, is—

1. Reversing the inner case containing the works and dial in the outer case to present the dial on either side.

2. Pivoting the inner case, containing the works and the dial, to the ring of the outer case substantially as herein described, or by equivalent means, so that it can be reversed to present the dial in either direction without disconnecting it from the outer case, as set forth.

In testimony whereof we have subscribed our names.

WICKLIFFE E. BALDWIN.
ELIHU BLISS.

Witnesses:
RICHARD A. MCCURDY,
THOMAS G. BROWN.